United States Patent [19]

Shitamori

[11] 4,298,211
[45] Nov. 3, 1981

[54] LOCK FOR A STAND OF A TWO-WHEELED VEHICLE

[75] Inventor: Mamoru Shitamori, Kobe, Japan

[73] Assignee: Kawasaki Jukogyo Kabushiki Kaisha, Kobe, Japan

[21] Appl. No.: 63,203

[22] Filed: Aug. 3, 1979

[30] Foreign Application Priority Data

Aug. 10, 1978 [JP] Japan ............................ 53-109862[U]

[51] Int. Cl.³ ............................................. B62H 5/00
[52] U.S. Cl. .................................... 280/297; 70/235; 280/301
[58] Field of Search ............... 280/297, 301, 302, 303; 70/233, 234, 235

[56] References Cited

U.S. PATENT DOCUMENTS 1,121,493 12/1914 Gordon .................................. 70/235
3,039,792 6/1962 Wood et al. ........................ 280/302
3,658,360 4/1972 Wood ................................. 280/302

FOREIGN PATENT DOCUMENTS 1122433 9/1956 France ................................. 280/297
445516 4/1936 United Kingdom .................. 70/235

Primary Examiner—Joseph F. Peters, Jr.
Assistant Examiner—Randall A. Schrecengost
Attorney, Agent, or Firm—Merriam, Marshall & Bicknell

[57] ABSTRACT

This disclosure deals with a locking mechanism for a stand that keeps a two-wheeled vehicle upright with one of its wheels substantially free of the vehicle weight. The stand is pivotable relative to a frame member of the vehicle to a standing position, and it has a recess therein. The lock mechanism has a lock member or pin which is movable to project therefrom by turning a key, the movement causing the pin to engage the recess when the stand is at the standing position.

2 Claims, 5 Drawing Figures

LOCK FOR A STAND OF A TWO-WHEELED VEHICLE

This invention relates to a locking mechanism for a stand of a two-wheeled vehicle, particularly a motorcycle, for preventing theft of the vehicle.

Motorcycles have conventionally been provided with a lock for locking the steering mechanism of the front wheel at a turned or biased direction to prevent the motorcycle from moving straight ahead, thus preventing it from being stolen. However, the lock bar or pin of the lock may be bent or broken when an extraordinary force is applied to turn the steering mechanism, so that the lock does not work. Likewise, a chain used to fasten a vehicle wheel to the frame can be easily broken by a cutting device.

It is a general object of this invention to provide a novel lock for a center stand of a motorcycle, which is extremely difficult to break or to remove unless the vehicle is disassembled.

Preferred embodiments of the invention will be described hereinafter by way of example, with reference to the accompanying drawings, wherein.

Figure 1:
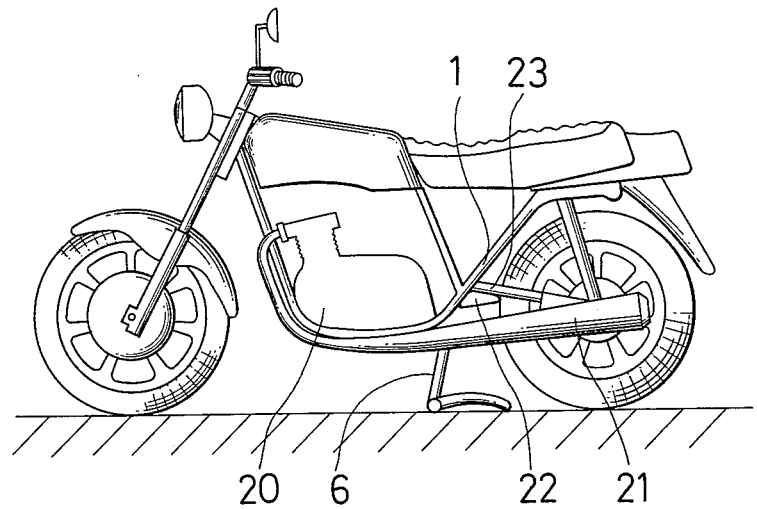
FIG. 1 is a diagramatic side view of a motorcycle including a lock according to this invention.
Figure 2:
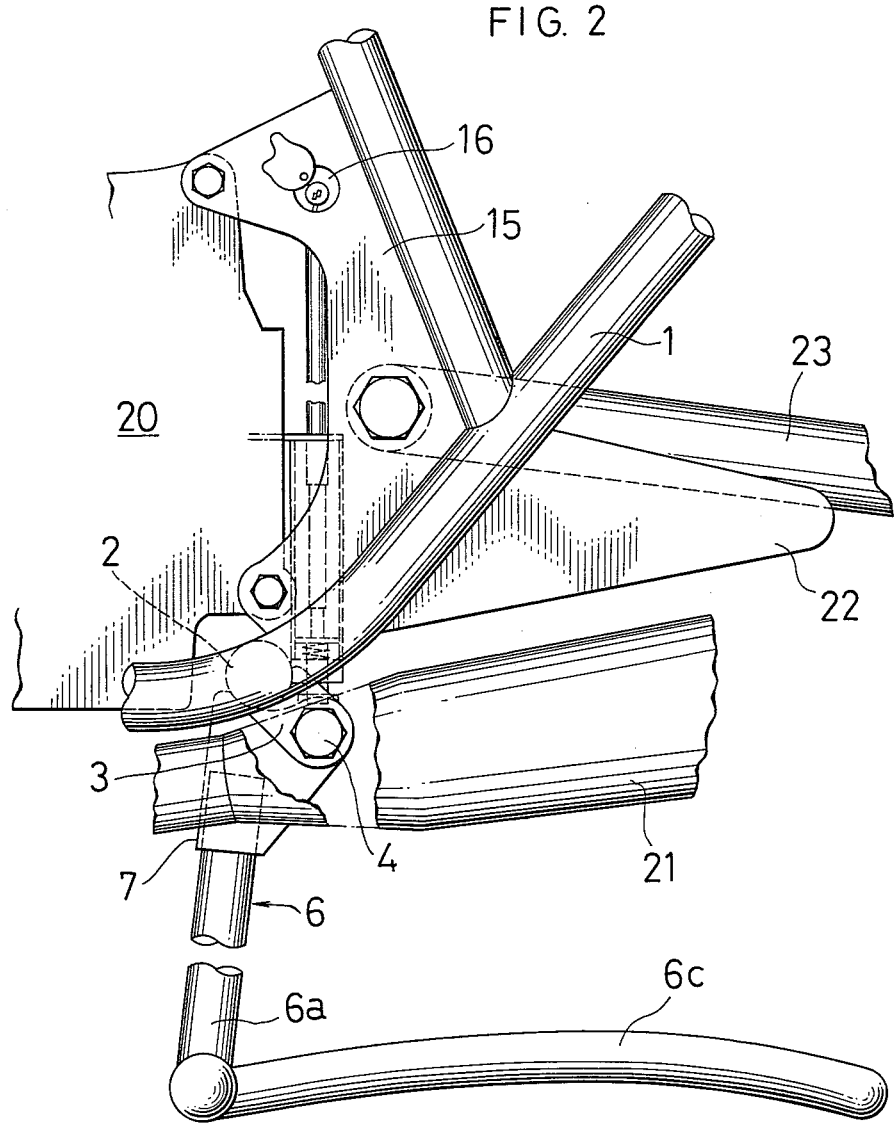
FIG. 2 is a fragmentary side view showing a lock according to this invention.
Figure 3:
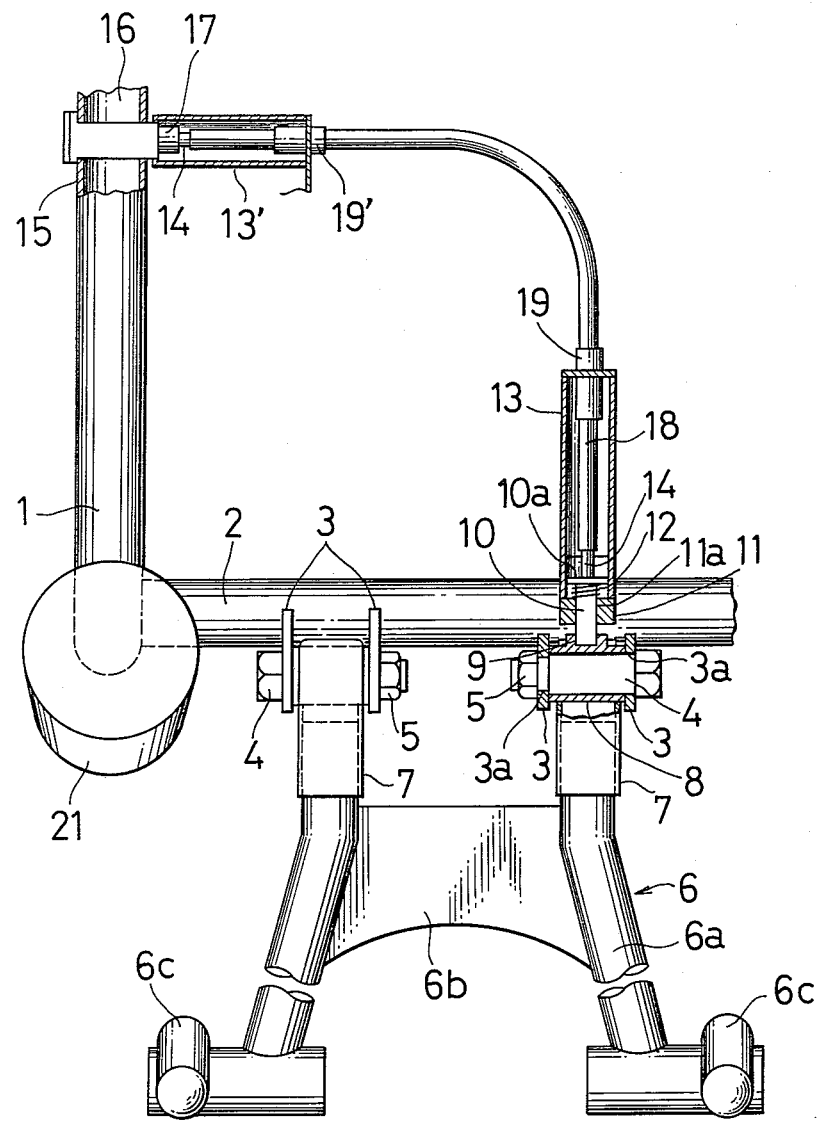
FIG. 3 is a fragmentary rear view of the lock shown in FIG. 2.

Referring first to FIGS. 1-3, a motorcycle includes a pair of frame members 1 one on each side of the vehicle, which are bridged by a cross member 2 near the lower part of the frame. Two pairs of brackets 3 are secured to the cross member 2 and extend downwardly and rearwardly from the member 2 as shown in FIG. 2. A pivot shaft or bolt 4 extends through openings 3a in each pair of brackets 3, and each shaft 4 is fixed in place by its head and a nut 5 that is threaded on the shaft. A stand 6 is supported by the brackets 3 and includes a pair of legs 6a which are bridged by a plate 6b, each leg having a fitting 7 fixed over one end thereof. As shown in FIGS. 2 and 3, when the stand is in the upright position, the legs 6 extend generally vertically and the fittings 7 are at the upper ends of the legs. A boss or sleeve 8 is secured to each fitting 7 and is positioned around one of the pivot shafts 4. As is best shown in FIG. 3, a leg 6a and fitting 7 is associated with each pair of brackets 3 and shaft 4, so that the stand 6 may pivot on the aligned axes of the shafts 4. One of the bosses 8 is formed with an opening or recess 9 in its outer periphery. In the standing position of the stand as illustrated, the upper sides of the fittings 7 abut the cross member 2 and the legs 6a angle downwardly and forwardly slightly so that the lower ends are positioned somewhat forward of the shafts 4, and the legs 6a are long enough to keep the vehicle standing with the rear wheel off of the ground or at least substantially free of the weight of the vehicle. A transverse foot 6c is preferably also attached to the lower end of each leg 6a.

The lock includes a lock member or pin 10 that is engageable with the recess 9 in order to lock the stand 6 in the standing position. The pin 10 is slidable in a bore 11a formed in a guide 11 that is secured to the cross member 2 closely above one of the bosses 8, and the lower portion of the pin 10 is able to project from the guide 11 to engage the recess 9. The pin 10 is formed with a flange 10a near the top thereof and a compression spring 12 is interposed between the flange 10a and the guide 11 in order to urge the pin 10 upwardly away from the recess 9. A protector or cover 13 is secured to the upper side of the guide 11 and encloses therein the spring 12 and the flange 10a which is slidable in the cover 13. The top end of pin 10 is connected to one end of a cable 14, the other end of which is connected to a pin 17 of an actuator or key lock 16 that is fixed to an engine bracket 15 (FIG. 2). Actuator 16 is operable using a key (not shown) which is turned to push the cable 14 against the force of spring 12, or to release the cable. Most of the cable 14 is closed by a protective tube 18 which is fixed with tubes 19 and 19' through the ends of protector 13 and another protector 13', respectively.

Instead of having the spring 12 arranged to urge the pin 10 out of the recess 9, the spring 12 could be arranged to urge the pin 10 to normally project into the recess. The boss 8 may be thickened around the recess 9 in order to strengthen it.

Figure 4:
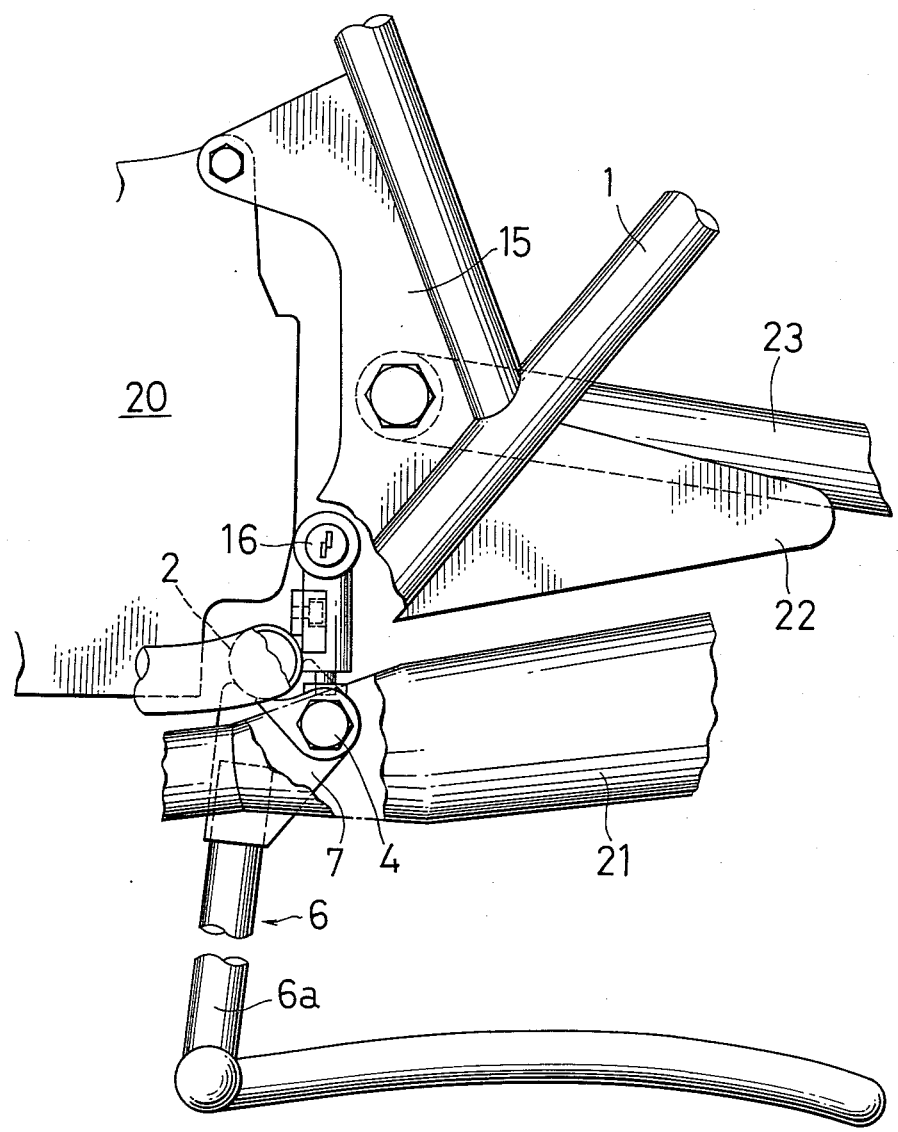
FIG. 4 is a fragmentary side view similar to FIG. 2 but showing another embodiment of the invention.
Figure 5:
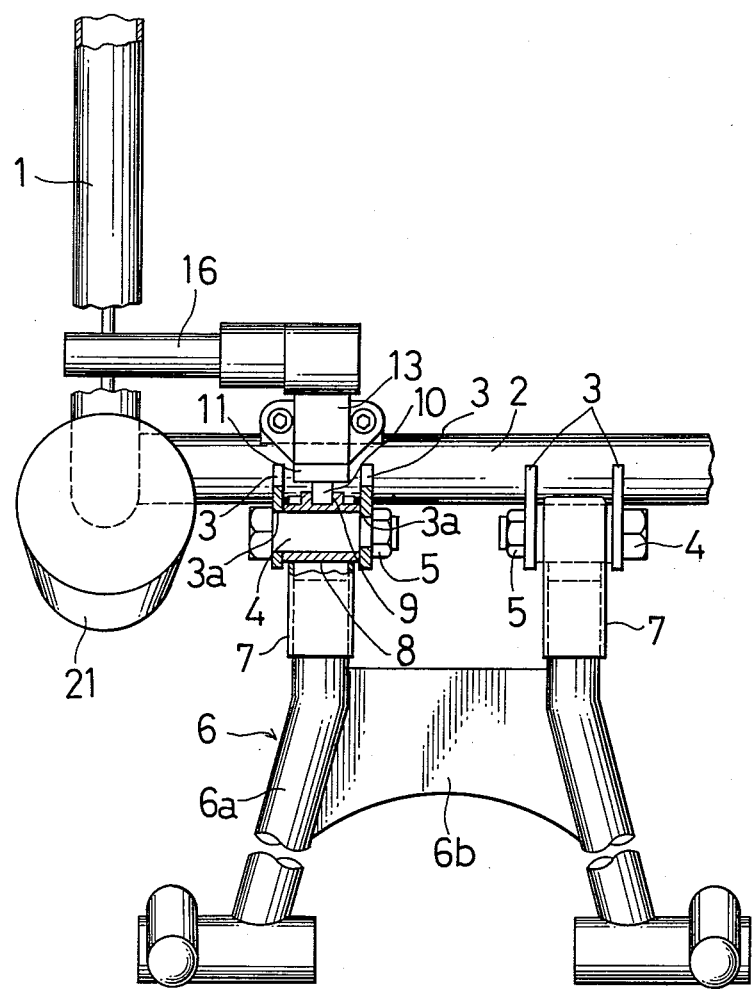
FIG. 5 is a fragmentary rear veiw of the lock shown in FIG. 4.

FIGS. 4 and 5 show another form of actuator 16 which is mounted on a lower portion of the engine bracket 15 and is connected directly to the pin 10 thereby eliminating the cable. The recess 9 is provided on a boss 8 secured to a leg 6a adjacent to the actuator 16. Actuator 16 is designed so that, by turning a key (not shown), the pin 10 projects from the guide 11 to engage the recess 9.

In both forms of the invention, the pin 10 engages the recess 9 and is embraced by the bore 11a of the guide 11, and it cannot be damaged even when a considerable force is exerted to pivot the stand 6 backwards from the standing position. The stand 6 is pivotable on the shafts 4 between the upright position shown in the drawings and a retracted position. When being moved to the retracted position, the legs 6a swing counterclockwise as seen in FIG. 1 and the legs 6a and the feet 6c swing up to an out-of-the-way position. When the stand is in the upright position shown in the drawings, the rear wheel is lifted slightly and the two legs 6a prevent the motorcycle from tipping sideways. When the lock is actuated by a key, the stand is secured in the upright position and prevents the motorcycle from being operated. The lock is movable from an engaged position where the pin extends into the recess and a disengaged position where the pin is free of the recess.

With reference to FIG. 1, most of the parts of the present locking mechanism are located behind an engine assembly 20, the frame 1, engine bracket 15 etc. In other words, the locking mechanism is enclosed by or located toward the center of the motorcycle from the other motorcycle parts. Specifically, the recess 9 and the pin 10 are behind a muffler 21 while the space around the locking mechanism is behind a muffler bracket 22, swing arm 23 etc. This arrangement prevents access to and tampering with the mechanism to cut the cable 14 together with the tube 18, or to remove the mechanism, unless the vehicle is disassembled. The vehicle is thereby prevented from being stolen unless it is carried away, for example, on a truck.

I claim:

1. In a motorcycle vehicle including a frame, wheels mounted adjacent the ends of the frame and engine parts mounted on the frame and between the wheels, the improvement comprising a locking mechanism to prevent theft of the vehicle, at least one pivot shaft secured to a lower portion of the frame between the wheels, a sleeve pivotally mounted on said shaft, said pivot shaft and said sleeve being mounted and enclosed within said frame and engine parts, whereby said pivot shaft and said sleeve are protected by said frame and said engine parts against access and tampering, a stand secured to said sleeve, the stand being pivotable between an upright position and a retracted position and said sleeve moving during such pivotal movement around the pivot shaft, said sleeve thus being supported by said pivot shaft and said stand being supported by said sleeve, said locking mechanism comprising a recess formed in said sleeve, and pin means mounted on said frame adjacent said recess and movable between an engaged position and a disengaged position, said recess and said pin means also being mounted and enclosed within said frame and engine parts, said pin means when in said engaged position extending into said recess when said stand is in said upright position and preventing said pivotal movement to said retracted position, and said pin means when in said disengaged position being displaced from said recess and permitting pivotal movement to said retracted position.

2. Apparatus as in claim 1, and further including key operated means for moving said pin.

* * * * *